(12) United States Patent
Arslan et al.

(10) Patent No.: US 8,809,785 B2
(45) Date of Patent: Aug. 19, 2014

(54) PANE WITH OPTICALLY TRANSPARENT SENSOR FIELD

(75) Inventors: Ilkay Arslan, Aachen (DE); Dirk Wohlfeil, Raeren (BE)

(73) Assignee: Saint-Gobain Glass France, Courbevoie (FR)

(*) Notice: Subject to any disclaimer, the term of this patent is extended or adjusted under 35 U.S.C. 154(b) by 163 days.

(21) Appl. No.: 13/381,639

(22) PCT Filed: Aug. 2, 2010

(86) PCT No.: PCT/EP2010/061207
§ 371 (c)(1),
(2), (4) Date: Dec. 29, 2011

(87) PCT Pub. No.: WO2011/015551
PCT Pub. Date: Feb. 10, 2011

(65) Prior Publication Data
US 2012/0119104 A1    May 17, 2012

(30) Foreign Application Priority Data

Aug. 4, 2009  (DE) .......................... 10 2009 026 319

(51) Int. Cl.
*G01J 1/42* (2006.01)
*G01S 7/481* (2006.01)
*B60R 11/04* (2006.01)
*B60R 11/00* (2006.01)

(52) U.S. Cl.
CPC ....... *G01S 7/4811* (2013.01); *B60R 2011/0026* (2013.01); *B60R 2011/0075* (2013.01); *B60R 11/04* (2013.01)

USPC .......................................................... 250/338.1

(58) Field of Classification Search
USPC .......................................................... 250/338.1
See application file for complete search history.

(56) References Cited

U.S. PATENT DOCUMENTS

| | | | |
|---|---|---|---|
| 6,303,225 B1 * | 10/2001 | Veerasamy | 428/408 |
| 6,825,469 B2 * | 11/2004 | Yamaguchi et al. | 250/330 |
| 2003/0059218 A1 | 3/2003 | Sakata et al. | |
| 2003/0082408 A1 * | 5/2003 | Saitoh et al. | 428/694 BP |
| 2006/0054701 A1 | 3/2006 | Inomata | |

(Continued)

FOREIGN PATENT DOCUMENTS

| | | |
|---|---|---|
| DE | 4315382 A1 * | 12/1993 |
| DE | 10 156 850 | 1/2003 |

(Continued)

OTHER PUBLICATIONS

Wee Yong Gan, Sai Wei Lam, Ken Chiang, Rose Amal, Huijun Zhao, and Michael Paul Brungs, "Novel TiO2 thin film with non-UV activated superwetting and antifogging behaviours." J. Mater. Chem., Feb. 9, 2007, 17, pp. 952-954. Downloaded Jan. 28, 2014 <doi:10.1039/b618280a>.*

(Continued)

*Primary Examiner* — Constantine Hannaher
(74) *Attorney, Agent, or Firm* — Steinfl & Bruno, LLP

(57) ABSTRACT

A pane having an optically transparent sensor field including: at least one panel; at least one optically transparent sensor field on the pane; at least one hydrophilic coating applied on the optically transparent sensor field; and at least one encapsulation applied to the optically transparent sensor field and at least one sensor applied in the encapsulation.

25 Claims, 5 Drawing Sheets

(56) References Cited

U.S. PATENT DOCUMENTS

Figure 1:
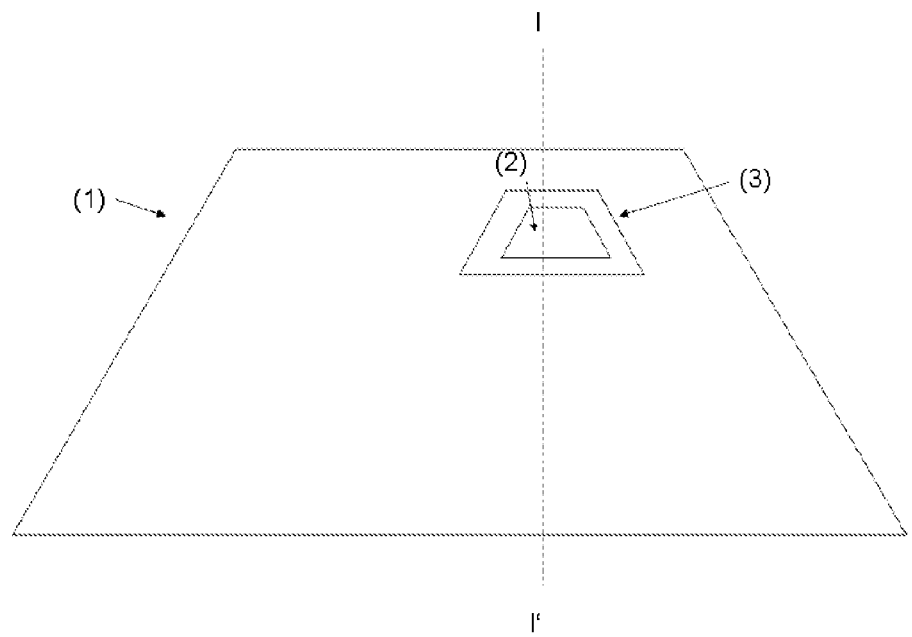

| | | |
|---|---|---|
| 2006/0171704 A1 | 8/2006 | Bingle et al. |
| 2007/0216768 A1 | 9/2007 | Smith et al. |
| 2010/0006555 A1 | 1/2010 | Maurer et al. |

FOREIGN PATENT DOCUMENTS

| | | |
|---|---|---|
| DE | 10 2004 059 132 | 9/2005 |
| DE | 10 2004 016 517 | 10/2005 |
| DE | 10 2004 054 161 | 8/2006 |
| DE | 102005040046 | 1/2007 |
| DE | 10 2007 012 993 | 9/2007 |
| DE | 10 2007 001 080 | 7/2008 |
| EP | 0 233 268 | 2/1987 |
| EP | 0 747 460 | 12/1996 |
| EP | 1 605 729 | 12/2005 |
| WO | 2009/083291 | 9/2009 |

OTHER PUBLICATIONS

PCT Search Report of International Application PCT/EP2010/061207 filed on Aug. 2, 2010 in the name of Saint-Gobain Glass France.

PCT Written Opinion issued Feb. 4, 2012 for PCT Application PCT/EP2010/061207 filed on Aug. 2, 2010 in the name of Saint-Gobain Glass France (German and English).

\* cited by examiner

PANE WITH OPTICALLY TRANSPARENT SENSOR FIELD

CROSS REFERENCE TO RELATED APPLICATIONS

The present application is the US national stage of International Application PCT/EP2010/061207 filed on Aug. 2, 2010, which, in turn, claims priority to German Patent Application DE 10 2009 026 319.5 filed on Aug. 4, 2009.

The invention relates to a pane with an optically transparent sensor field, a method for its production, and its use.

Many motor vehicles, airplanes, helicopters, and ships are equipped with various optical sensors. Examples of optical sensors are camera systems, such as video cameras, night vision cameras, residual light amplifiers, or passive infrared detectors, such as FLIR (forward looking infrared). The camera systems can use light in the ultraviolet (UV), visible (VIS), and infrared wavelength range (IR). Thus, even with bad weather conditions, such as darkness and fog, objects, motor vehicles, and people can be precisely detected. These camera systems can be placed in motor vehicles behind the windshield in the passenger compartment. Thus, even in traffic, they offer the possibility of detecting hazardous situations and obstacles in a timely manner.

There are additional fields of application for optical sensors in electronic distance measurement (EDM), for example, using laser range finders. The distance to other motor vehicles can be determined. Such systems are widely used in the military sector but there are many possible applications in the civilian sector as well. With measurements of the distance from the preceding vehicle, it is possible to determine the necessary safe following distance and significantly increase traffic safety. The risk of a rear-end collision is clearly reduced with automatic warning systems.

Because of their sensitivity to weather conditions or air flows around the vehicle, such sensors must, in all cases, be protected by appropriate panes. The sensor can either be installed inside a motor vehicle or outside as with thermal imaging cameras of helicopters. In the latter case, the sensor is installed outside on the helicopter in a pivotable housing. To ensure optimal function of the optical sensors, with both options, clean and condensation-free panes are absolutely essential. Condensation and icing clearly interfere with functionality since they clearly reduce the transmission of electromagnetic radiation. In particular, the formation of drops of water in the beam path of the sensor results, because of strong light reflections, in a marked limitation of the functionality of the sensor.

DE 10 2007 001 080 A1 discloses an electrically heatable windowpane. This is supplied with current using electrical busbars and is thus heated. The conductors are arranged such that only limited electromagnetic fields develop. Thus, operation of devices that react with sensitivity to electromagnetic fields is possible even in the region of the pane.

DE 101 56 850 A1 discloses a sensor in a motor vehicle window pane, the lens of which sensor is sealed off from the vehicle interior by an encapsulation. This construction prevents the deposition of dust particles on the lens. A particle filter is provided for air exchange.

DE 10 2004 054 161 A1 discloses an infrared detection region in a motor vehicle windshield. The infrared detection region is surrounded by heating elements that keep it free of ice and condensation.

EP 1 605 729 A2 discloses an electrically heatable pane with a camera window. This camera window is kept free of condensation and ice by a heating arrangement. The heating element is laminated into the pane at the position of the camera window. Also, an additional heating element can be applied on the surface of the pane. The additional heating element is preferably printed onto the surface of the pane as conductive paste.

EP 0 747 460 A1 discloses an anti-condensation coating for glass and plastic substrates. The coating contains a polymer with hydroxyl groups, an aluminium-based crosslinker, and a surfactant.

EP 0 233 268 B1 discloses a glass or plastic substrate that is provided with an anti-condensation coating. The polymer coating contains a linear, hydrophilic polyether-polyurethane and between 35 wt.-% and 60 wt.-% water.

In many panes with camera windows, condensation which appears is removed by heating systems. However, this requires expensive electrical contacting, particularly in the edge region of the pane. Moreover, control arrangements are essential for the control of the heating arrangement. These subsequent installations are in many cases costly and not possible with all motor vehicles. In addition, further electrical loads increase electricity and fuel consumption.

The object of the invention is to provide a pane with an optically transparent sensor field that can be produced from finished, standard panes and is not dependent on an additional electricity and heat source.

The object of the present invention is accomplished according to the invention by a pane with an optically transparent sensor field, a method for its production, and its use according to independent claims 1, 13, and 15. Preferred embodiments emerge from the subclaims.

The invention comprises a pane with an optically transparent sensor field. The pane comprises at least one pane and an optically transparent sensor field arranged on the surface or as a part of the pane. In the context of the invention, the expression "optically transparent sensor field" includes the part of the pane that supplies the sensor with the appropriate optical and electromagnetic data or signals. This can be any part of the pane or an inserted pane segment or film segment that has high transmission for the appropriate optical and electromagnetic signals. The characteristic "optically transparent" refers, in the context of the invention, to the wavelength range from 200 nm to 2000 nm, preferably 400 nm to 1300 nm. The mean transmission is, in the wavelength range from 400 nm to 1300 nm, preferably more than 70%. The optically transparent sensor field occupies preferably less than 10%, particularly preferably less than 5% of the surface of the pane.

A hydrophilic coating is applied to the surface of the pane in the region of the optically transparent sensor field. The hydrophilic coating can be bonded to the pane either by chemical bonds or by physical absorption. The hydrophilic coating includes both polar organic groups and inorganic, preferably ionic, compounds. The hydrophilic coating can be designed as a mono- or multilayer molecular film or as a polar organic and/or inorganic polymer. The hydrophilic coating also preferably includes crosslinkers. These compounds support the bond within the hydrophilic coating and the bond of the hydrophilic coating with the surface of the pane. Examples of suitable crosslinkers on glass panes are polar silanes, for example, 3-aminopropyltrimethoxysilane ($C_6H_{17}NO_3Si$/CAS no. 13822-56-5) or N-(hydroxyethyl)-N-methylaminopropyltrimethoxysilane ($C_9H_{23}NO_4Si$/CAS no. 330457-46-0). In the context of the invention, the hydrophilic coating also includes a hydrophilic water-absorbing coating.

An encapsulation and a sensor applied in the encapsulation are affixed on the surface of the pane in the region of the optically transparent sensor field. The encapsulation protects the sensor from contaminant particles and dust particles as well as undesired incidence of light. The encapsulation is preferably arranged in the upper region of the pane, preferably not more than 30% of the height of the pane away from the top and/or bottom border. The encapsulation contains preferably a polymer, particularly preferably polybutylene terephthalate, polyamides, polycarbonate, polyurethanes, polybutylene, polypropylene, polyethylene, polyethylene terephthalate, polyvinyl chloride, polystyrene, acrylonitrile butadiene styrene, ethylene vinyl acetate, ethylene vinyl alcohol, polyimides, polyesters, polyketones, polyether ether ketones, polymethyl methacrylate, mixtures, block polymers, and/or copolymers thereof.

The sensor field preferably has an opaque and/or colored border. The border can be designed as either a border strip or as a border region.

The sensor preferably includes cameras for visible light of the wavelengths from 400 nm to 800 nm and infrared light of the wavelengths from 800 nm to 1300 nm.

The structure according to the invention preferably has electrical contacting only for the sensor. The sensor field and the hydrophilic coating preferably contain no electrical contacting and no heating arrangement. Heating of the sensor field is unnecessary because of the hydrophilic coating. This also includes the directly adjacent regions of the sensor field and the hydrophilic coating.

The pane preferably includes glass, particularly preferably flat glass, float glass, quartz glass, borosilicate glass, soda lime glass, or polymers, preferably polymethyl methacrylate and/or mixtures thereof.

The pane preferably includes single-pane safety glass (ESG) or laminated safety glass (VSG).

The sensor field preferably has optical transparency to visible light (VIS) and/or infrared radiation (IR) of >60%, preferably >70%.

The hydrophilic coating preferably contains polymers with COH, COOH, NH, $NH_2$, COONH, $SO_3$, $SO_2$, CN, OCN, SCN groups, particularly preferably acrylic acid esters, polyethylene glycols, polysaccharides, polypeptides, polyurethanes, polyethers, and/or copolymers and/or mixtures thereof.

The hydrophilic coating preferably contains hydrophilic silanes, for example, 3-aminopropyltrimethoxysilane ($C_6H_{17}NO_3Si$/CAS no. 13822-56-5) and/or N-(hydroxyethyl)-N-methylaminopropyltrimethoxysilane ($C_9H_{23}NO_4Si$/CAS no. 330457-46-0), silane-containing polymers, and/or copolymers and/or mixtures thereof.

The hydrophilic coating preferably contains surface-absorbed hydrophilic particles, such as $TiO_2$. In particular, even with low permeability of the pane to UV light, $TiO_2$-containing particles can decompose organic contaminants on the pane.

The surface-absorbed hydrophilic particles have a mean particle size of 2 nm to 1 μm, preferably 10 nm to 300 nm.

The hydrophilic coating preferably has a layer thickness of 10 nm to 50 μm, preferably 100 nm to 5 μm.

The hydrophilic coating preferably has a contact angle against water of <25°, preferably <15°.

The hydrophilic coating preferably contains an antistatic coating, particularly preferably quaternary ammonium compounds, silver, copper, tin, gold, aluminium, iron, tungsten, chromium, and/or alloys thereof and/or a conductive organic polymer. The antistatic coating reduces the accumulation of dust particles in the beam path of the sensor. Dust particles and moisture bound thereto interfere, through light reflection and absorption, with the functional capability of the sensor. The antistatic coating can extend beyond the actual sensor field to dissipate electrical potentials.

The hydrophilic coating preferably contains a carrier foil. The hydrophilic coating can thus be adhered simply in the area of the pane that must be permeable to the beam path of the sensor.

The carrier foil contains polymers, preferably polybutylene terephthalate, polycarbonate, polyethylene terephthalate, polyethylene naphthalate, polyvinyl butyral, polyethylene, polypropylene, polyurethane, polyepoxides, polyacrylates, and/or poly ethyl vinyl acetate, mixtures, block copolymers, and/or copolymers thereof.

The carrier foil preferably has optical transparency to visible light and/or infrared radiation of >80%, preferably >90%.

The carrier foil preferably contains an adhesive, particularly preferably acrylate adhesives, methyl methacrylate adhesives, cyanoacrylate adhesives, polyepoxides, silicone adhesives, and/or silane crosslinking polymer adhesives, mixtures and/or copolymers thereof. The carrier foil is preferably self adhesive.

The encapsulation is preferably applied in the upper region of the windshield, preferably behind a covering strip.

The encapsulation preferably contains desiccants, particularly preferably silica gel, $CaCl_2$, $Na_2SO_4$, activated charcoal, silicates, bentonites, and/or zeolites.

The object of the invention is further accomplished by a method for production of a pane with an optically transparent sensor field, wherein, in a first step, a hydrophilic coating is applied on the sensor field of a pane. The application can be done, for example, by spreading and/or spraying. Depending on the hydrophilic coating, curing or crosslinking of the hydrophilic coating can be necessary. This can be done preferably by UV radiation, thermal treatment, or atmospheric humidity. In a second step, an encapsulation with a sensor is applied on the edge region of the hydrophilic coating. The encapsulation is preferably applied in motor vehicles in the upper and/or lower region of the pane outside the field of vision.

The hydrophilic coating is preferably applied over a carrier foil and can thus be adhered simply in the region of the pane that has to be permeable to the beam path of the sensor. Conventional panes can be retrofitted simply and at a reasonable cost.

The invention further includes the use of the pane with an optically transparent sensor field in motor vehicles, ships, airplanes, and helicopters, preferably as a windshield and/or rear window of a motor vehicle.

In the following, the invention is explained in detail with reference to drawings. The drawings in no way restrict the invention.

Figure 2:
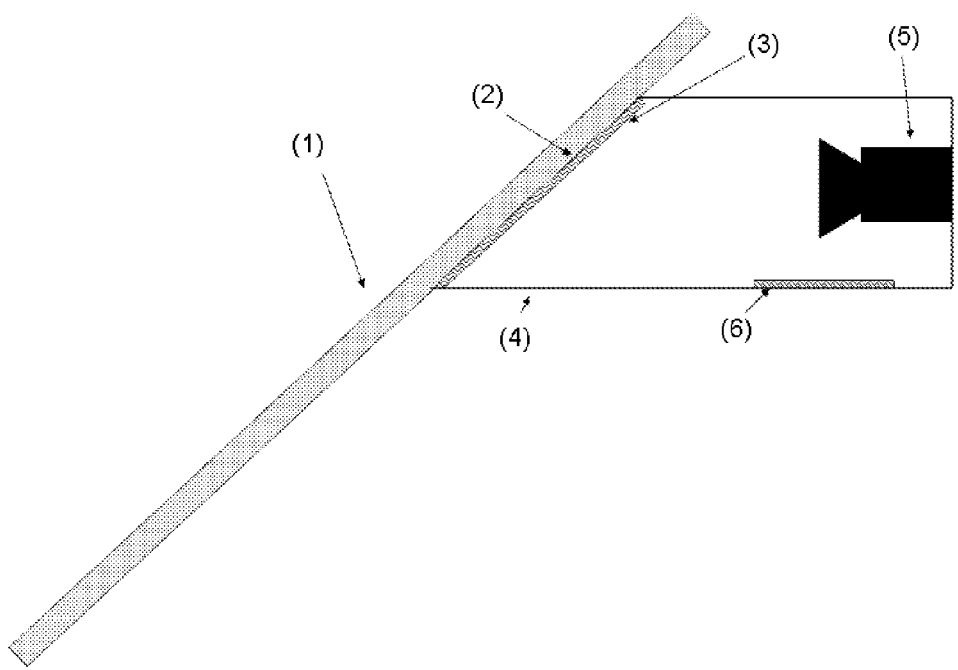
Figure 3:
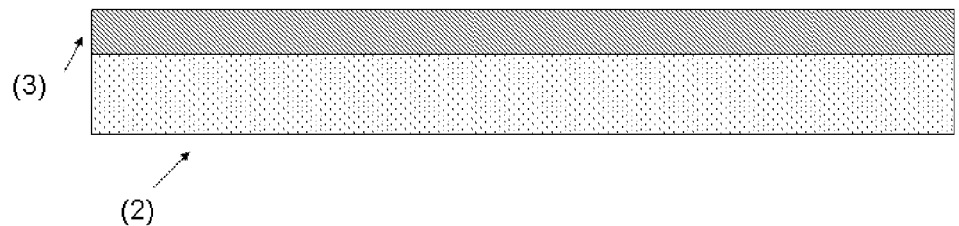
Figure 4:
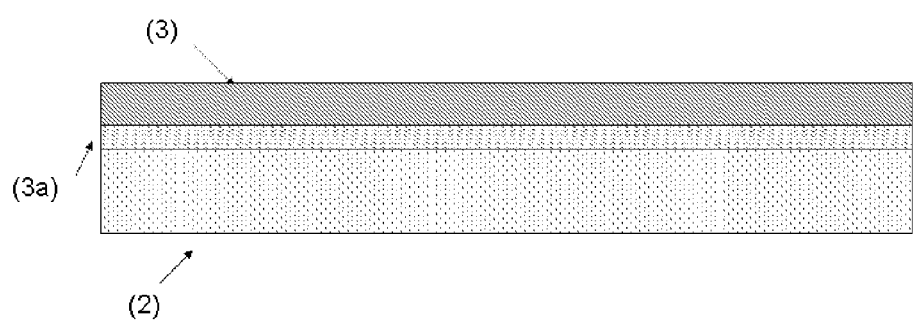
Figure 5:
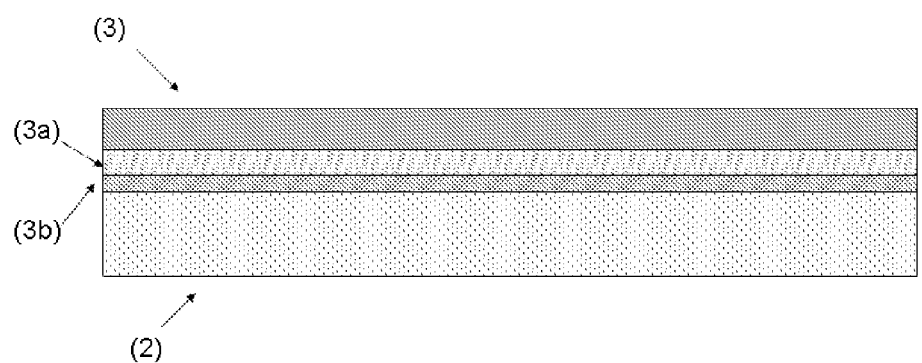

They depict:

FIG. 1 a plan view of the pane (1) according to the invention,

FIG. 2 a cross-section of a preferred embodiment of the pane (1) according to the invention with the optically transparent sensor field (2), FIG. 3 a cross-section of the optically transparent sensor field (2), FIG. 4 another cross-section of the optically transparent sensor field (2), and FIG. 5 another cross-section of the optically transparent sensor field (2).

FIG. 1 shows a plan view of the pane (1) according to the invention. A hydrophilic coating (3) is arranged on an optically transparent sensor field (2). The optically transparent sensor field (2) includes the part of the pane (1) that supplies the sensor (5) depicted in FIG. 2 with the appropriate optical and electromagnetic data or signals. This can be any part of the pane (1) or an inserted pane segment that has high transmission for the appropriate optical and electromagnetic signals.

FIG. 2 depicts a cross-section along the height of the pane I to I' in FIG. 1 of a preferred embodiment of the pane (1) according to the invention with an optically transparent sensor field (2). A hydrophilic coating (3) is arranged on the interior side of the pane (1) in the region of the optically transparent sensor field (2). The sensor (5) oriented toward the optically transparent sensor field (2) is located in an encapsulation (4) affixed on the optically transparent sensor field (2). Desiccants (6) are arranged inside the encapsulation (4). The desiccants (6) are preferably incorporated into the surface of the encapsulation (4).

FIG. 3 depicts a cross-section of the optically transparent sensor field (2). In this case, the hydrophilic coating (3) is applied directly on the surface of the pane.

FIG. 4 depicts a cross-section of a preferred embodiment of the optically transparent sensor field (2). The hydrophilic coating (3) is applied on a carrier foil (3a) and affixed on the sensor field (2). The depicted structure of sensor field (2), hydrophilic coating (3), and carrier foil (3a) preferably has no electrical contacting, since heating of the sensor field (2) is unnecessary because of the hydrophilic coating (3). Electrical contact is necessary only for the sensor (5) not depicted in FIG. 4.

FIG. 5 depicts another cross-section of a preferred embodiment of the optically transparent sensor field (2). The hydrophilic coating (3) is applied on a carrier foil (3a) and affixed on the sensor field (2) by an optically transparent adhesive layer (3b).

LIST OF REFERENCE CHARACTERS (1) pane according to the invention
(2) optically transparent sensor field
(3) hydrophilic coating
(3a) carrier foil
(3b) adhesive layer
(4) encapsulation
(5) sensor
(6) desiccants

The invention claimed is:

1. A device comprising:
at least one pane,
at least one optically transparent sensor field on the pane,
at least one hydrophilic coating applied on the optically transparent sensor field,
at least one encapsulation applied on the optically transparent sensor field, and
at least one sensor applied in the encapsulation,
wherein the hydrophilic coating contains surface-absorbed hydrophilic particles and a carrier foil.

2. The device according to claim 1, wherein the sensor field has an opaque and/or colored border.

3. The device according to claim 1, wherein the sensor field has optical transparency to visible light and/or infrared radiation of >60%.

4. The device according to claim 3, wherein the sensor field has optical transparency to visible light and/or infrared radiation of >70%.

5. The device according to claim 1, wherein the hydrophilic coating contains polymers with COH, COOH, NH, $NH_2$, COONH, $SO_3$, $SO_2$, CN, OCN, SCN groups.

6. The device of claim 5, wherein the hydrophilic coating contains polymers with acrylic acid esters, polyethylene glycols, polysaccharides, polypeptides, polyurethanes, polyethers, polyvinyl butyral, polyvinyl pyrrolidone, silanes, silane-containing polymers, copolymers, and/or mixtures thereof.

7. The device according to claim 1, wherein the hydrophilic coating has a layer thickness of 10 nm to 50 µm.

8. The device according to claim 7, wherein the hydrophilic coating has a layer thickness of 100 nm to 25 µm.

9. The device according to claim 1, wherein the hydrophilic coating has a contact angle against water of <25°.

10. The device according to claim 9, wherein the hydrophilic coating has a contact angle against water of <15°.

11. The device according to claim 1, wherein the hydrophilic coating contains an antistatic coating.

12. The device according to claim 11, wherein the antistatic_coating contains quaternary ammonium compounds, silver, copper, tin, gold, aluminum, iron, tungsten, chromium, or alloys thereof and/or a conductive organic polymer.

13. The device according to claim 1, wherein the carrier foil has optical transparency to visible light and/or infrared radiation of >80%.

14. The device according to claim 13, wherein the carrier foil has optical transparency to visible light and/or infrared radiation of >90%.

15. The device according to claim 1, wherein the encapsulation is applied in an upper region of a windshield.

16. The device according to claim 15, wherein the encapsulation is applied behind a covering strip.

17. The device according to claim 1, wherein the encapsulation contains desiccants.

18. The device according to claim 17, wherein the encapsulation contains silica gel, $CaCl_2$, $Na_2SO_4$, activated charcoal, silicates, bentonites, and/or zeolites.

19. The device of claim 1, wherein the hydrophilic coating contains $TiO_2$.

20. The device of claim 1, wherein the hydrophilic coating contains surface-absorbed hydrophilic particles with a mean particle size of 2 nm to 1 µm.

21. The device of claim 20, wherein the hydrophilic coating contains surface-absorbed hydrophilic particles with a mean particle size of 10 nm to 300 nm.

22. A method for production of a pane with an optically transparent sensor field, comprising:
applying a hydrophilic coating containing surface-absorbed hydrophilic particles and a carrier foil on a sensor field of a pane and
affixing an encapsulation with a sensor on the hydrophilic coating.

23. A method comprising:
using the device according to claim 1 in motor vehicles, ships, airplanes, or helicopters,
wherein optical and electromagnetic data or signals are transmitted through at least one optically transparent sensor field.

24. The method of claim 23, wherein the device is used as windshield and/or rear window of a motor vehicle.

25. A device comprising:
a vehicle windshield pane;
an encapsulated sensor, comprising:
an encapsulation with at least one open end;
a carrier foil enclosing the at least one open end;
surface-absorbed hydrophilic particles on the carrier foil on a side interior to the encapsulation such that the transparency of a sensor field on the carrier foil is at least 70% for visible and infrared light;
an opaque or colored border surrounding the sensor field;

a sensor within the encapsulation arranged to receive visible and infrared light through the sensor field;
a desiccant located within the encapsulation and below the sensor; and
an adhesive layer connecting the carrier foil to the vehicle windshield pane.

* * * * *